(12) United States Patent
Welsh

(10) Patent No.: US 9,561,849 B2
(45) Date of Patent: Feb. 7, 2017

(54) VEHICLE CONFIGURATION WITH MOTORS THAT ROTATE BETWEEN A LIFTING POSITION AND A THRUSTING POSITION

(71) Applicant: Amazon Technologies, Inc., Seattle, WA (US)

(72) Inventor: Ricky Dean Welsh, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 157 days.

(21) Appl. No.: 14/626,357

(22) Filed: Feb. 19, 2015

(65) Prior Publication Data

US 2016/0244157 A1 Aug. 25, 2016

(51) Int. Cl.
*B64C 27/52* (2006.01)
*B64C 11/46* (2006.01)
*B64C 27/28* (2006.01)
*B64C 39/02* (2006.01)

(52) U.S. Cl.
CPC .............. *B64C 27/52* (2013.01); *B64C 11/46* (2013.01); *B64C 27/28* (2013.01); *B64C 39/024* (2013.01); *B64C 2201/021* (2013.01); *B64C 2201/024* (2013.01); *B64C 2201/027* (2013.01); *B64C 2201/108* (2013.01); *B64C 2201/128* (2013.01); *B64C 2201/165* (2013.01)

(58) Field of Classification Search
CPC .......... B64C 27/52; B64C 11/46; B64C 27/28; B64C 2201/027; B64C 2201/024; B64C 2201/108; B64C 2201/165
See application file for complete search history.

(56) References Cited

U.S. PATENT DOCUMENTS

2011/0042508 A1 2/2011 Bevirt

FOREIGN PATENT DOCUMENTS

DE 102012104783 A1 12/2013

OTHER PUBLICATIONS

International Search Report and Written Opinion of PCT Application No. PCT/US16/18548 dated May 11, 2016.

*Primary Examiner* — Brian M O'Hara
(74) *Attorney, Agent, or Firm* — Athorus, PLLC

(57) ABSTRACT

This disclosure describes a configuration of an unmanned aerial vehicle ("UAV") that will facilitate extended flight duration. The UAV may have any number of lifting motors. For example, the UAV may include four lifting motors (also known as a quad-copter), eight lifting motors (also known as an octo-copter), etc. Likewise, to improve the efficiency of horizontal flight, the UAV also includes a pivot assembly that may rotate about an axis from a lifting position to a thrusting position. The pivot assembly may include two or more offset motors that generate a differential force that will cause the pivot assembly to rotate between the lifting position and the thrusting position without the need for any additional motors or gears.

15 Claims, 8 Drawing Sheets

VEHICLE CONFIGURATION WITH MOTORS THAT ROTATE BETWEEN A LIFTING POSITION AND A THRUSTING POSITION

BACKGROUND

Multi-propeller aerial vehicles (e.g., quad-copters, octo-copters) are becoming more common. All such vehicles require a body configuration that will support the separation of the multiple propellers, the control components, the power supply (e.g., battery), etc. However, there is a balance between weight and duration of flight. As the weight increases, for example to support more components, the flight duration will decrease.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
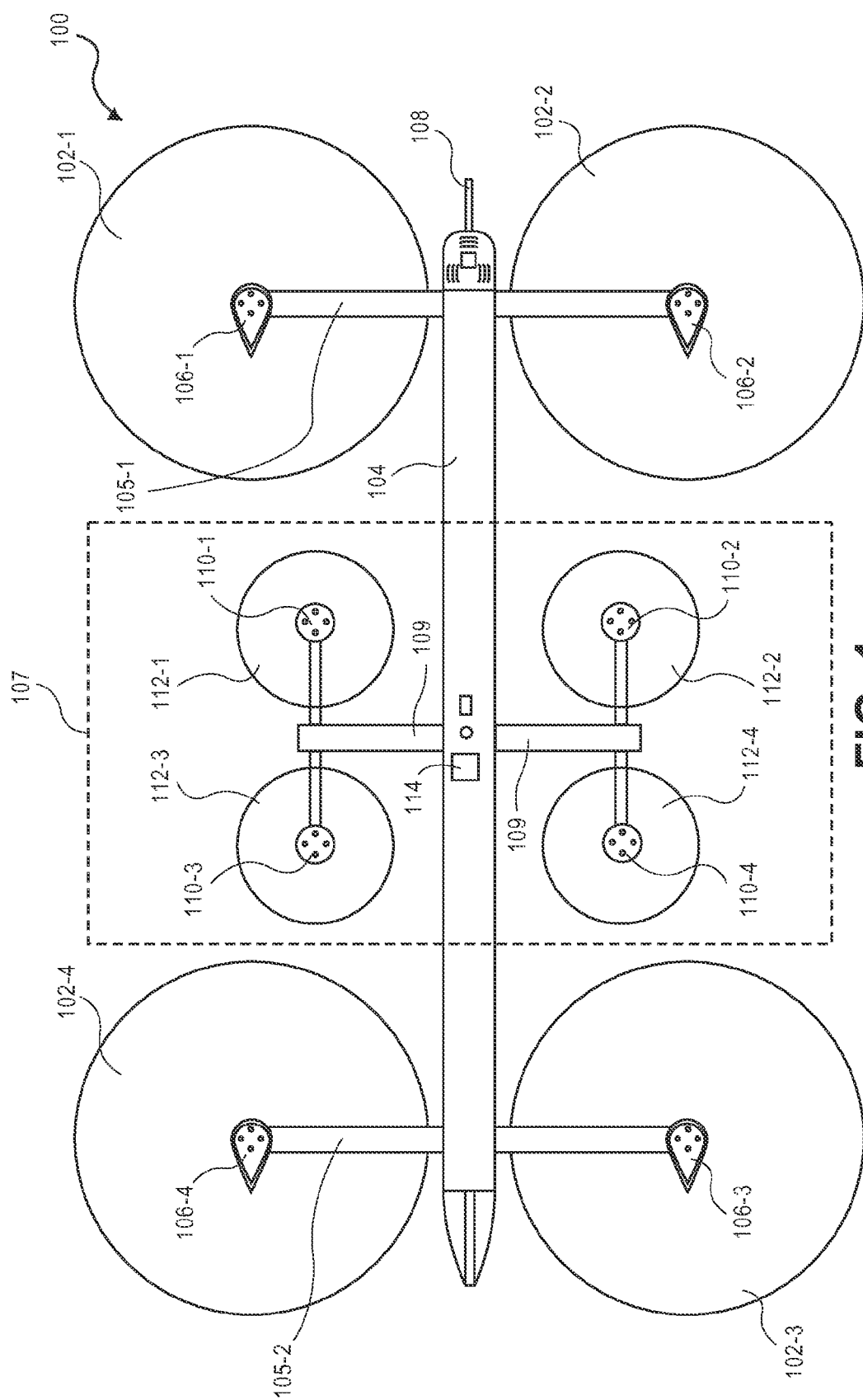
FIG. 1 depicts a block diagram of a top-down view of an unmanned aerial vehicle with a pivot assembly in a lifting position, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes a configuration of an unmanned aerial vehicle ("UAV") that will facilitate extended flight duration. The UAV may have any number of lifting motors. For example, the UAV may include four lifting motors (also known as a quad-copter), eight lifting motors (also known as an octo-copter), etc. Likewise, to improve the efficiency of horizontal flight, the UAV also includes a pivot assembly that may rotate about an axis from a lifting position to a thrusting position. The pivot assembly may include two or more motors, referred to herein as thrusting motors, that are offset from one another about the axis. When the pivot assembly is in a lifting position, the thrusting motors and corresponding propellers, referred to herein as thrusting propellers, are aligned with the frame of the UAV 100 and may be used to provide lifting force to aid in the vertical lift of the UAV. When the pivot assembly is in a thrusting position, the thrusting motors and corresponding thrusting propellers are positioned approximately perpendicular to the frame of the UAV 100 and may be engaged to provide horizontal thrust to move the UAV in a substantially horizontal direction.

In some implementations, when the pivot assembly is in the thrusting position and the thrusting motors and corresponding thrusting propellers are generating thrust, the rotational speed of the lifting motors may be reduced, thereby improving efficiency and reducing power consumption of the UAV. Likewise, in some implementations, the UAV may include a wing to aid in the vertical lift of the UAV while the UAV is moving in a substantially horizontal direction.

The thrusting motors and corresponding thrusting propellers of the pivot assembly are offset with respect to one another about an axis so that the two thrusting motors may be used to rotate the pivot assembly between the lifting position and the thrusting position. For example, rather than utilizing another motor, such as a servo motor, a gear assembly, or other additional component to rotate the pivot assembly between the lifting position and the thrusting position, the force generated by a first thrusting motor and corresponding thrusting propeller may be increased or decreased with respect to the force generated by a second, offset thrusting motor and corresponding thrusting propeller to move the pivot assembly between the lifting position and the thrusting position. For example, if the force generated by the first motor is greater than the force generated by the second motor, the resulting differential force will cause the pivot assembly to rotate from the lifting position to the thrusting position. If the force generated by the second motor is greater than the force generated by the first motor, the resulting differential force will cause the pivot assembly to rotate from the thrusting position to the lifting position. In another implementation, rather than offsetting two motors, a single motor and propeller, in which the motor is capable of rotating the propeller in either direction, may be utilized. For example, if the motor rotates the propeller in a first rotational direction (e.g., clockwise), the force generated by the propeller may cause the pivot assembly to rotate so that the motor and propeller are in a thrusting position. If the motor rotates the propeller in a second rotational direction (e.g., counter-clockwise), the force generated may cause the pivot assembly to rotate so that the motor and propeller are in a lifting position.

To further improve the efficiency of the UAV, in some implementations, the frame, motor arms, wing, propellers, and/or other components of the UAV may be formed of one or more lightweight materials, such as carbon fiber, graphite, machined aluminum, titanium, fiberglass, etc.

Regardless of material, each of the motor arms, and/or motor housing may be hollow, thereby reducing weight and providing a cavity through which one or more wires and/or cables may be passed and/or in which other components may be housed. For example, wires that connect the motors (e.g., lifting motors, thrusting motors) to components located in or around the frame (e.g., electronic speed control ("ESC")) may be passed through the inner portion of one or more of the motor housings and motor arms.

While the examples discussed herein describe the implementations with respect to a UAV, the implementations may likewise be utilized on other types of vehicles. For example, the pivot assembly described herein may be utilized on an aerial vehicle, a ground based vehicle, an unmanned ground based vehicle, a water based vehicle, and/or an unmanned water based vehicle.

FIG. 1 illustrates a block diagram of a top-down view of a UAV 100 with a pivot assembly 107 in a lifting position, according to an implementation. As illustrated, the UAV 100 includes a frame 104. The frame 104 or body of the UAV 100 may be formed of any suitable material, such as graphite, carbon fiber, aluminum, etc., or any combination thereof. In this example, the frame 104 of the UAV 100 is formed of machined aluminum in a rectangular shape.

Mounted to the frame are two motor arms 105-1, 105-2. In this example, the motor arms 105-1, 105-2 are approximately the same length, are arranged substantially parallel to one another and perpendicular to the frame 104. In other implementations, the motor arms 105 may be of different lengths (e.g., the front motor arm 105-1 may be shorter than the rear motor arm 105-2 and/or arranged at different locations on the UAV 100.

Mounted to each end of the motor arms 105 are lifting motors 106-1, 106-2, 106-3, and 106-4. The lifting motor may be mounted so that propeller shaft of the lifting motor that mounts to the propeller 102 is facing downward with respect to the UAV 100. In other implementations, the lifting motors may be mounted with the propeller shaft facing upwards with respect to the UAV 100. In still other implementations, one or more of the lifting motors may be mounted with the propeller shaft facing downward and one or more of the lifting motors may be mounted with the propeller shaft facing upward. In other implementations, the lifting motors may be mounted at other angles with respect to the frame of the UAV 100. The lifting motors may be any form of motor capable of generating enough rotational speed with the propellers to lift the UAV 100 and any engaged payload, thereby enabling aerial transport of the payload.

In some implementations, the lifting motors 106 may be encased within a motor housing that has an aerodynamic shape to improve the airflow around the motors while the UAV 100 is moving in a direction that includes a horizontal component. The motor housings may be formed of any material, such as carbon fiber, aluminum, graphite, etc.

Mounted to each lifting motor is a lifting propeller 102-1, 102-2, 102-3, and 102-4. The lifting propellers 102 may be any form of propeller (e.g., graphite, carbon fiber) and of a size sufficient to lift the UAV 100 and any payload engaged by the UAV 100. For example, the lifting propellers 102 may each be carbon fiber propellers having a dimension or diameter of twenty-nine inches. While the illustration of FIG. 1 shows the lifting propellers 102 all of a same size, in some implementations, one or more of the lifting propellers 102 may be different sizes and/or dimensions. Likewise, while this example includes four lifting propellers, in other implementations, more or fewer propellers may be utilized as lifting propellers. Likewise, in some implementations, the propellers may be positioned at different locations on the UAV 100. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the UAV.

Mounted to a first end, or front end, of the frame 104 of the UAV 100 is one or more antennas 108. The antennas 108 may be used to transmit and/or receive wireless communications. For example, the antennas 108 may be utilized for Wi-Fi, satellite, near field communication ("NFC"), cellular communication, or any other form of wireless communication. Other components, such as cameras, time of flight sensors, distance determining elements, gimbals, etc. may likewise be mounted to the front of the frame 104 of the UAV 100.

A UAV control system 114 is also mounted to the frame 104. In this example, the UAV control system 114 is mounted to a top of the frame 104. In other implementations, the UAV control system 114, or components thereof, may be mounted or positioned at other locations of the UAV 100. The UAV control system 114, as discussed in further detail below with respect to FIG. 8, controls the operation, routing, navigation, communication, motor controls, and the payload engagement mechanism of the UAV 100.

Likewise, the UAV 100 includes one or more power modules (not shown). The power modules may be mounted to various locations on the frame 104 of the UAV 100. For example, in some implementations, four power modules may be mounted to an underneath side of the frame 104 within a fuselage (not shown). The power modules for the UAV 100 may be in the form of battery power, solar power, gas power, super capacitor, fuel cell, alternative power generation source, or a combination thereof. For example, the power modules may each be a 6000 mAh lithium-ion polymer battery, or polymer lithium ion (Li-poly, Li-Pol, LiPo, LIP, PLI, or Lip) battery. The power module(s) are coupled to and provide power for the UAV control system 114, the lifting motors 106, and the thrusting motors 110, the payload engagement mechanism, etc.

In some implementations, one or more of the power modules may be configured such that it can be autonomously removed and/or replaced with another power module while the UAV is landed or in flight. For example, when the UAV 100 lands at a location, the UAV may engage with a charging member at the location that will recharge the power module.

As mentioned above, the UAV 100 may also include a payload engagement mechanism (not shown). The payload engagement mechanism may be configured to engage and disengage a payload (e.g., an item or a container that contains items). In other implementations, the payload engagement mechanism may operate as the container, in which it contains item(s). In this example, the payload engagement mechanism is positioned beneath the frame 104 of the UAV 100. The payload engagement mechanism communicates with (via wired or wireless communication) and is controlled by the UAV control system 114.

Also coupled to the frame 104 is a pivot assembly 107. In this example, the pivot assembly 107 includes four motors 110-1, 110-2, 110-3, 110-4, referred to herein as thrusting motors, and four corresponding propellers 112-1, 112-2, 112-3, 112-4, referred to herein as thrusting propellers. The thrusting motors 110 and the thrusting propellers 112 of the pivot assembly 107 may be the same or different than the lifting motors 106 and lifting propellers 102. In some implementations, the thrusting propellers 112 may have a smaller dimension than the lifting propellers 102. In other implementations, the thrusting propellers 112 may have a larger dimension than the lifting propellers 102. In still other implementations, one or more of the thrusting propellers may be single-blade propellers or folding propellers. For example, the thrusting propellers 112-1, 112-2, which may not be used when the pivot assembly 107 is in the thrusting position, may be folding propellers that fold in the direction of the wind so that they do not generate drag when the UAV 100 is moving in a horizontal direction.

The thrusting motors 110 are coupled to a pivot arm 109 that extends from the frame 104 of the UAV 100 and is configured to rotate about an axis with respect to the frame 104 of the UAV 100. As discussed further below with respect to FIGS. 6-7, the pivot assembly 107 may include stops that stop the rotation of the pivot assembly at desired positions (lifting position, thrusting position).

In this example, the pivot assembly 107 includes four thrusting motors 110 and corresponding thrusting propellers 112 positioned about the pivot arm 109. In other implementations, fewer or additional thrusting motors and corresponding thrusting propellers may be utilized, provided there are at least two thrusting motors offset with respect to one another about an axis, in this example the pivot arm 109. In the example illustrated in FIG. 1, the thrusting motor 110-1 is offset from thrusting motor 110-3 and thrusting motor 110-4. Likewise, thrusting motor 110-2 is offset from thrusting motor 110-4 and thrusting motor 110-3. Thrusting motor 110-3 is offset from thrusting motor 110-1 and thrusting motor 110-2. Thrusting motor 110-4 is offset from thrusting motor 110-2 and thrusting motor 110-1.

Figure 2:
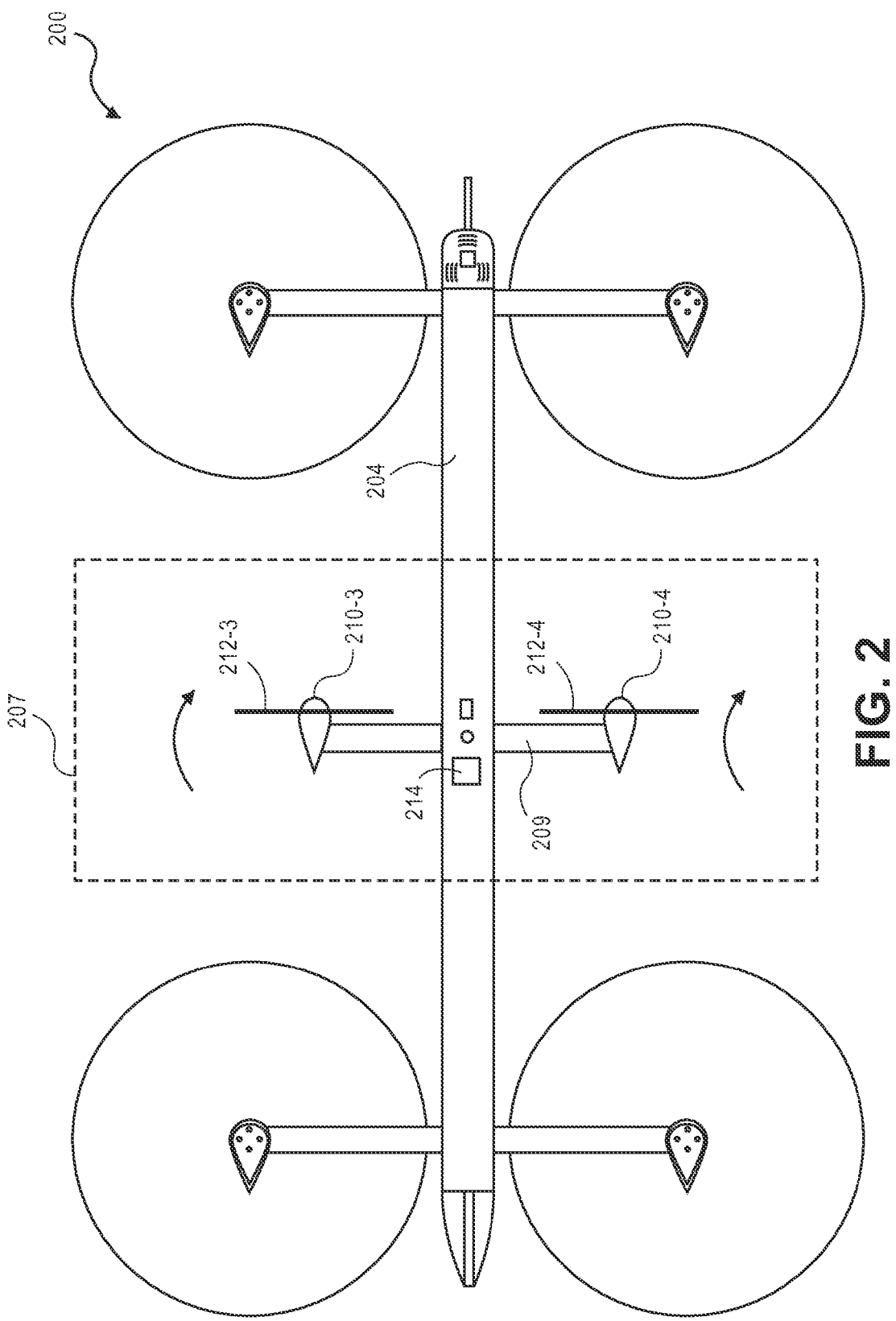
FIG. 2 depicts a block diagram of a top-down view of an unmanned aerial vehicle with a pivot assembly in a thrusting position, according to an implementation.

In this example, as long as the combined force generated by thrusting motor 110-1 and thrusting motor 110-2 is greater than or equal to the combined force generated by thrusting motor 110-3 and thrusting motor 110-4, the pivot assembly will remain in the lifting position, as illustrated in FIG. 1. For example, the thrusting motors 110-3, 110-4 may be disengaged and the thrusting motors 110-1, 110-2 may be engaged and generate a force by rotating the corresponding thrusting propellers 112-1, 112-2. If the combined force generated by thrusting motor 110-3 and thrusting motor 110-4 is greater than the combined force generated by thrusting motor 110-1 and thrusting motor 110-2, the pivot assembly will rotate to the thrusting position, as illustrated in FIG. 2. In some implementations, the pivot assembly 107 may include a dampener, electric brake or other inertial component that requires a differential force between the offset thrusting motors to exceed a threshold before the pivot assembly 107 will rotate from the lifting position, illustrated in FIG. 1, to the thrusting position, illustrated in FIG. 2, or from the thrusting position to the lifting position. Likewise, the dampener or other inertial component may be used to position the pivot assembly 107 at other angles with respect to the frame 104 of the UAV 100. As used herein, the term "inertial component" refers to any braking mechanism, whether effective through friction (static, dynamic, or viscous) or inertia used to dampen, restrict, stop, resist, or otherwise bias against rotation of pivot assembly 107 about its axis.

FIG. 2 depicts a block diagram of a top-down view of the unmanned aerial vehicle 200 with the pivot assembly 207 in a thrusting position, according to an implementation. Except where otherwise noted, reference numerals preceded by the number "2" shown in FIG. 2 indicate components or features that are similar to components or features having reference numerals preceded by the number "1" shown in FIG. 1.

When the pivot assembly 207 is in the thrusting position, one or more of the thrusting motors 210 may be engaged to provide horizontal thrust via the corresponding thrusting propeller 212 to propel the UAV 200 horizontally. For example, the thrusting motors 210-3, 210-4 may be engaged to generate thrust from the rotation of the corresponding thrusting propellers 212-3, 212-4. Likewise, the thrusting motors 110-1, 110-2 (not shown in FIG. 2) may operate at a rotational speed that is less than thrusting motors 210-3, 210-4, or the thrusting motors 110-1, 110-2 may be disengaged.

Figure 3:
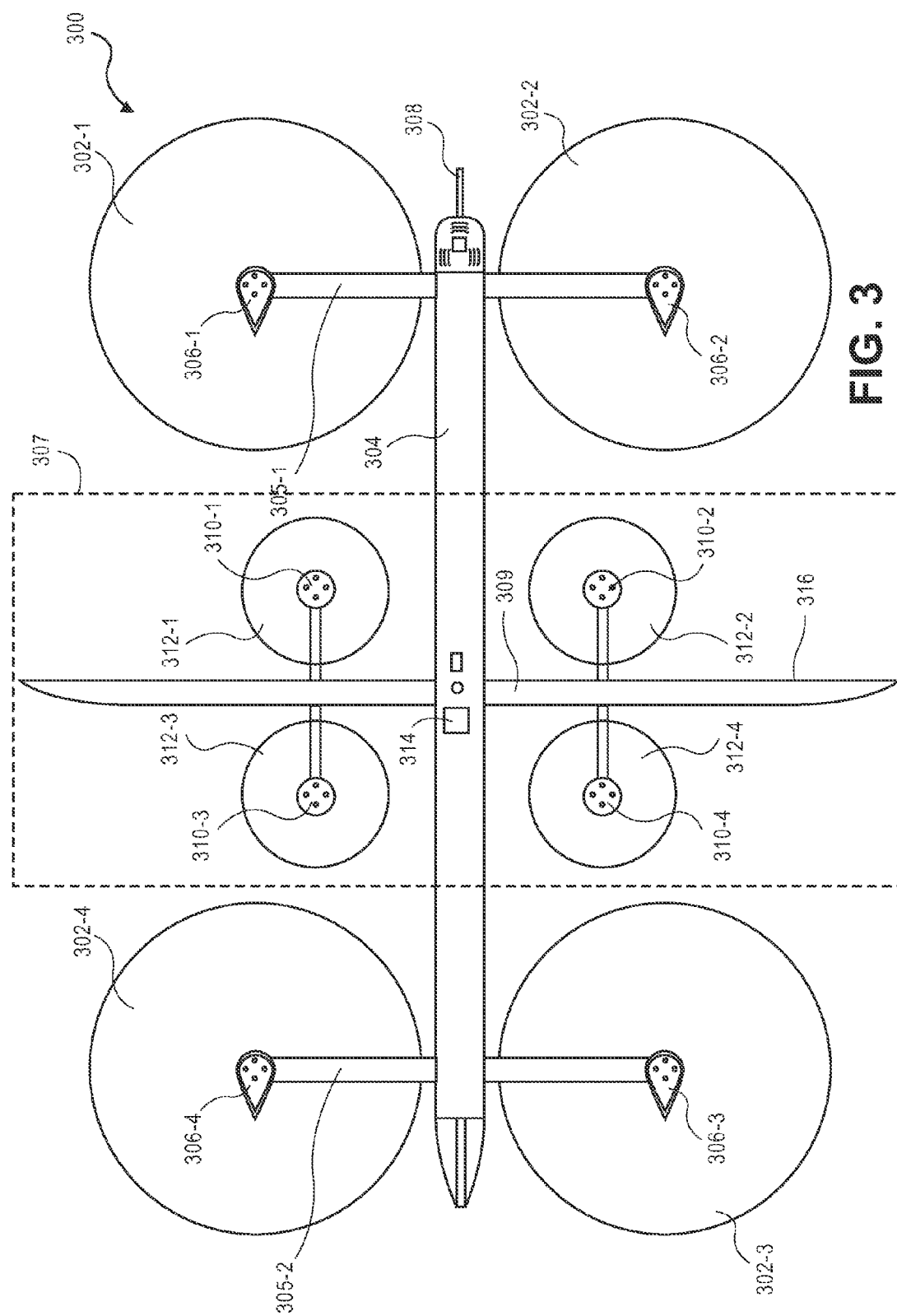
FIG. 3 depicts a block diagram of another top-down view of an unmanned aerial vehicle with a pivot assembly in a lifting position, according to an implementation.

While the implementations of the UAVs discussed herein utilize propellers to achieve and maintain flight, in other implementations, the UAV may be configured in other manners. For example, the UAV may include fixed wings and/or a combination of both propellers and fixed wings. For example, FIG. 3 depicts another block diagram of a top-down view of a UAV 300 that includes a pivot assembly 307 in which the pivot arm 309 is a wing, according to an implementation. Except where otherwise noted, reference numerals preceded by the number "3" shown in FIG. 3 indicate components or features that are similar to components or features having reference numerals preceded by the number "1" shown in FIG. 1.

Similar to the UAV 100 discussed above with respect to FIG. 1, the UAV includes a frame 304, motor arms 305-1, 305-2, lifting motors 306-1, 306-2, 306-3, 306-4, lifting propellers 302-1, 302-2, 302-3, 302-4, antennas 308, UAV control system 314, power modules, payload engagement mechanism, etc.

Also coupled to the frame 304 is the pivot assembly 307. In this example, the pivot assembly 307 includes four thrusting motors 310-1, 310-2, 310-3, 310-4 and four corresponding thrusting propellers 312-1, 312-2, 312-3, 312-4.

The thrusting motors 310 are coupled to a pivot arm 309 that extends from the frame 304 of the UAV 300 and is configured to rotate about an axis with respect to the frame 304 of the UAV 300. As discussed further below with respect to FIGS. 6-7, the pivot assembly 307 may include stops that stop the rotation of the pivot assembly at desired positions (lifting position, thrusting position).

In this example, pivot arm 309 includes a wing shape on either side of the frame 304 of the UAV. Thrusting motors and corresponding thrusting propellers are mounted on the top and bottom sides of each wing shape. In some implementations the pivot arm 309 may be a single arm that extends through the frame 304 of the UAV 300 such that both wings of the pivot arm rotate together. In other implementations, each wing of the pivot arm may rotate independent of the other wing of the pivot arm. If the wing shapes on either side of the frame 304 rotate independently, each wing will have an offset pair of thrusting motors and corresponding thrusting propellers. If the wings on either side of the frame 304 are affixed to and essentially part of a single pivot arm that extends through the frame 304, only two offset motors are needed. Thus, while the example illustrated in FIG. 3 shows four thrusting motors 310-1, 310-2, 310-3, 310-4 and corresponding thrusting propellers 302-1, 302-2, 302-3, 302-4, in other implementations there may be additional or fewer thrusting motors and corresponding thrusting propellers, provided that there are at least two thrusting motors offset with respect to one another about an axis, in this example the pivot arm 309. In the example illustrated in FIG. 3, the thrusting motor 310-1 is offset from thrusting motor 310-3 and thrusting motor 310-4. Likewise, thrusting motor 310-2 is offset from thrusting motor 310-4 and thrusting motor 310-3. Thrusting motor 310-3 is offset from thrusting motor 310-1 and thrusting motor 310-2. Thrusting motor 310-4 is offset from thrusting motor 310-2 and thrusting motor 310-1.

Figure 4:
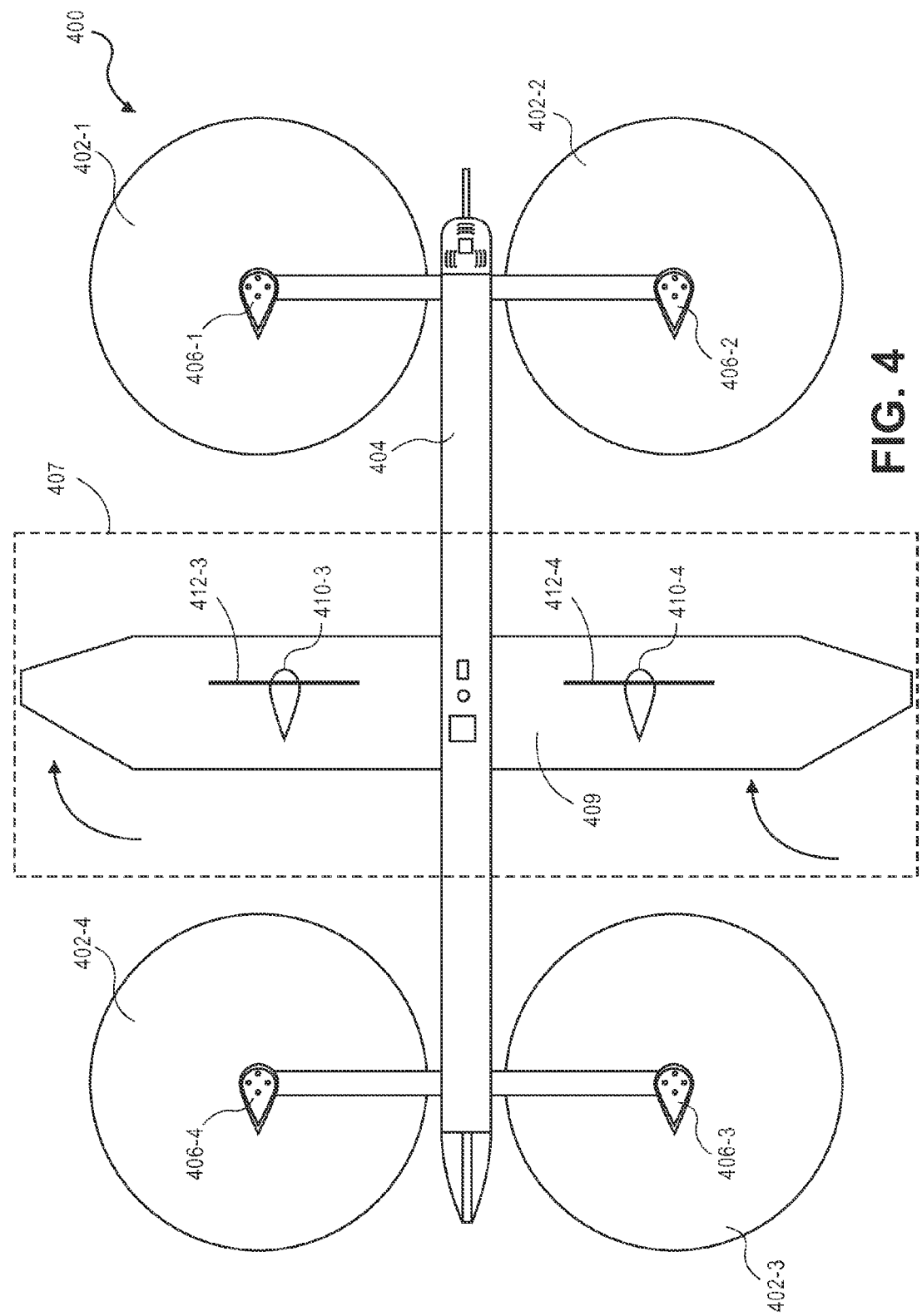
FIG. 4 depicts a block diagram of another top-down view of an unmanned aerial vehicle with a pivot assembly in a thrusting position, according to an implementation.

Similar to the pivot assembly 107 discussed above with respect to FIG. 1, as long as the combined force generated by thrusting motor 310-1 and thrusting motor 310-2 is greater than or equal to the combined force generated by thrusting motor 310-3 and thrusting motor 310-4, the pivot assembly will remain in the lifting position, as illustrated in FIG. 3. For example, the thrusting motors 310-3, 310-4 may be disengaged and the thrusting motors 310-1, 310-2 may be engaged and generate a force by rotating the corresponding thrusting propellers 312-1, 312-2. If the combined force generated by thrusting motor 310-3 and thrusting motor 310-4 is greater than the combined force generated by thrusting motor 310-1 and thrusting motor 310-2, the pivot assembly will rotate to the thrusting position, as illustrated in FIG. 4. In some implementations, the pivot assembly 307 may include a dampener, electric brake or other inertial component that requires a differential force between the offset thrusting motors to exceed a threshold before the pivot assembly 307 will rotate from the lifting position, illustrated in FIG. 3, to the thrusting position, illustrated in FIG. 4, or from the thrusting position to the lifting position. Likewise, the dampener or other inertial component may be used to position the pivot assembly 307 at other angles with respect to the frame 304 of the UAV 300.

FIG. 4 depicts a block diagram of a top-down view of the unmanned aerial vehicle 400 with the pivot assembly 407 in a thrusting position, according to an implementation. Except where otherwise noted, reference numerals preceded by the number "4" shown in FIG. 4 indicate components or features that are similar to components or features having reference numerals preceded by the number "3" shown in FIG. 3.

When the pivot assembly 407 is in the thrusting position, one or more of the thrusting motors 410 may be engaged to provide horizontal thrust via the corresponding thrusting propeller 412 to propel the UAV 400 horizontally. For example, the thrusting motors 410-3, 410-4 may be engaged to generate thrust from the rotation of the corresponding thrusting propellers 412-3, 412-4. Likewise, the thrusting motors 310-1, 310-2 (not shown in FIG. 4) may operate at a rotational speed that is less than thrusting motors 410-3, 410-4, or the thrusting motors 310-1, 310-2 may be disengaged.

In this example, because the pivot arm 409 is in the shape of a wing, as the UAV 400 moves horizontally, the wing shape of the pivot arm generates a vertical lifting force. The wing shape of the pivot arm 409 may be formed of any suitable material such as, but not limited to, carbon fiber, graphite, aluminum, plastic, fiberglass, etc.

The wing shape of the pivot arm 409 is designed to have an airfoil shape to provide lift to the UAV 400 as the UAV 400 moves horizontally. In some implementations, utilizing the thrusting motors 410 and corresponding thrusting propellers 412 in conjunction with the wing shaped pivot arm 409, when the UAV 400 is moving in a direction that includes a horizontal component, the rotational speed of the lifting motors 406-1, 406-2, 406-3, 406-4 and corresponding lifting propellers 402-1, 402-2, 402-3, 402-4 may be reduced or eliminated because the wing shape of the pivot arm 409 may provide sufficient lift and keep the UAV 400 airborne when thrust in a horizontal direction by the thrusting motors 410 and thrusting propellers 412 is applied. In implementations where the wing shape of the pivot arm 409 includes flaps and/or ailerons, the pitch, yaw and roll of the UAV 400 may be controlled using the flaps and/or ailerons alone or in combination with the lifting motors and lifting propellers 402. If the wing shape of the pivot arm 409 does not include flaps and/or ailerons, the lifting motors and lifting propellers 402 may be utilized to control the pitch, yaw, and roll of the UAV 400 during flight.

Figure 5:
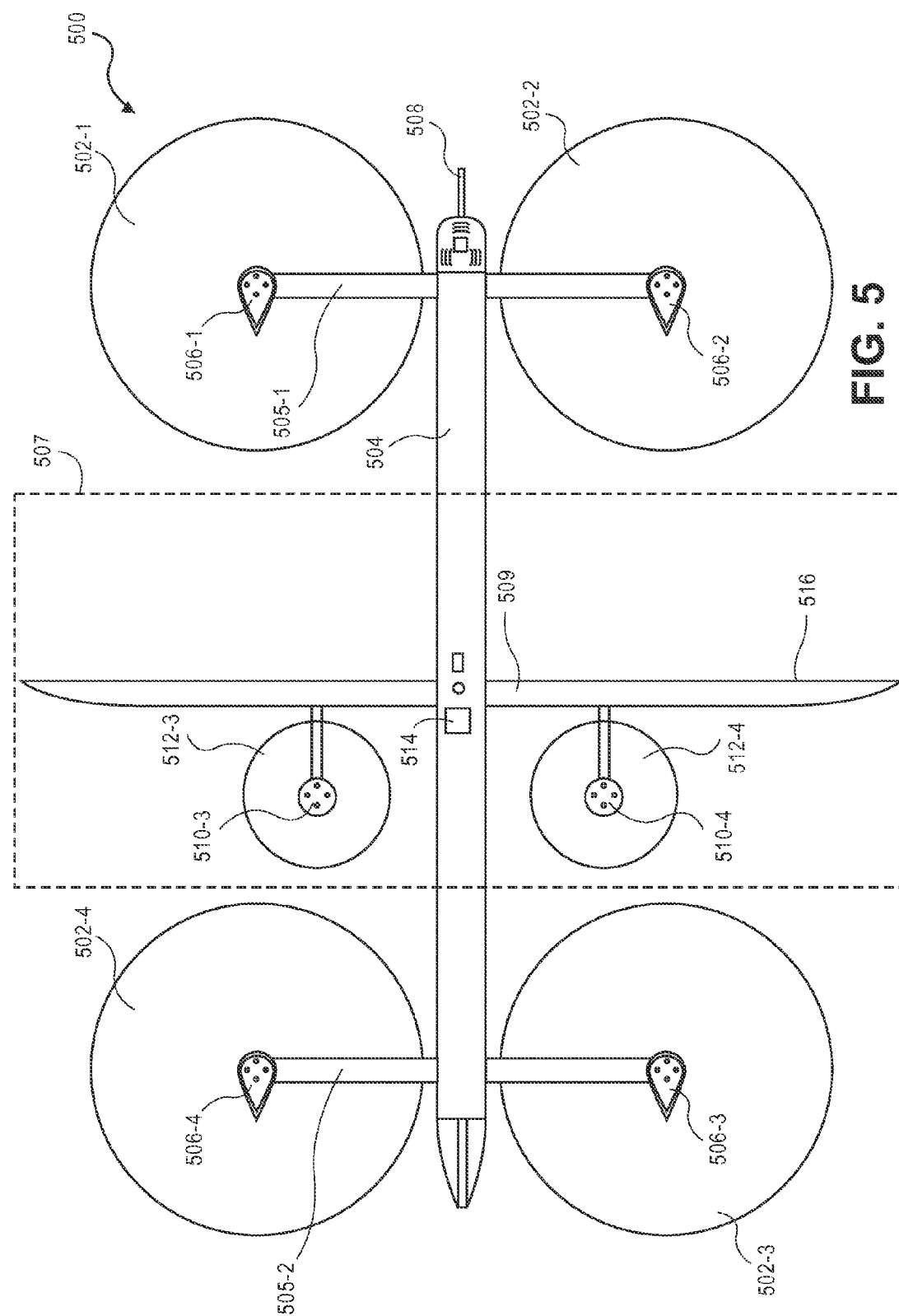
FIG. 5 depicts a block diagram of another top-down view of an unmanned aerial vehicle with a pivot assembly in a lifting position, according to an implementation.

FIG. 5 depicts another block diagram of a top-down view of a UAV 500 that includes a pivot assembly 507 in which the pivot arm 509 is a wing, according to an implementation. Except where otherwise noted, reference numerals preceded by the number "5" shown in FIG. 5 indicate components or features that are similar to components or features having reference numerals preceded by the number "3" shown in FIG. 3.

Similar to the UAV 300 discussed above with respect to FIG. 3, the UAV includes a frame 504, motor arms 505-1, 505-2, lifting motors 506-1, 506-2, 506-3, 506-4, lifting propellers 502-1, 502-2, 502-3, 502-4, antennas 508, UAV control system 514, power modules, payload engagement mechanism, etc.

Also coupled to the frame 504 is a pivot assembly 507. In this example, the pivot assembly 507 includes two thrusting motors 510-3, 510-4 and two corresponding thrusting propellers 512-3, 512-4. In contrast to the thrusting motors discussed above with respect to FIG. 3, the thrusting motors 510-3, 510-4 are configured to rotate the thrusting propellers 512-3, 512-4 in either direction. For example, when the thrusting motors 510-3, 510-4 rotate in a first rotational direction (e.g., clockwise), the thrusting propellers 512-3, 512-4 generate a directional force in a first direction. When the thrusting motors 510-3, 510-4 rotate in a second rotational direction (e.g., counter-clockwise), the thrusting propellers 512-3, 512-4 generate a direction force in a second, opposite direction.

The thrusting motors 510 are coupled to a pivot arm 509 that extends from the frame 504 of the UAV 500 and is configured to rotate about an axis with respect to the frame 504 of the UAV 500. As discussed further below with respect to FIGS. 6-7, the pivot assembly 507 may include stops that stop the rotation of the pivot assembly at desired positions (lifting position, thrusting position).

In this example, pivot arm 509 includes a wing shape on either side of the frame 504 of the UAV. In this example, the thrusting motors and corresponding thrusting propellers are mounted on the top of each wing shape. In other implementations, the thrusting motors and corresponding thrusting propellers may be mounted on the bottom of each wing shape. In this implementation, when the thrusting motors 510-3, 510-4 rotate in a first rotational direction the force generated by the corresponding thrusting propellers 512-3, 512-4 will generate a downward direction force that will cause the pivot assembly to remain in the lifting position, as illustrated in FIG. 5. If the thrusting motors 510-3, 510-4 are rotated in a second rotational direction, the resulting force generated by the corresponding thrusting propellers 512-3, 512-4 will cause the pivot assembly to rotate to the thrusting position, similar to the thrusting position illustrated in FIG.

4, above. In some implementations, the pivot assembly 507 may include a dampener, electric brake or other inertial component that requires a force generated by the thrusting motors to exceed a threshold before the pivot assembly 507 will rotate from the lifting position, illustrated in FIG. 5, to the thrusting position, illustrated in FIG. 4, or from the thrusting position to the lifting position. Likewise, the dampener or other inertial component may be used to position the pivot assembly 507 at other angles with respect to the frame 504 of the UAV 500.

Figure 6:
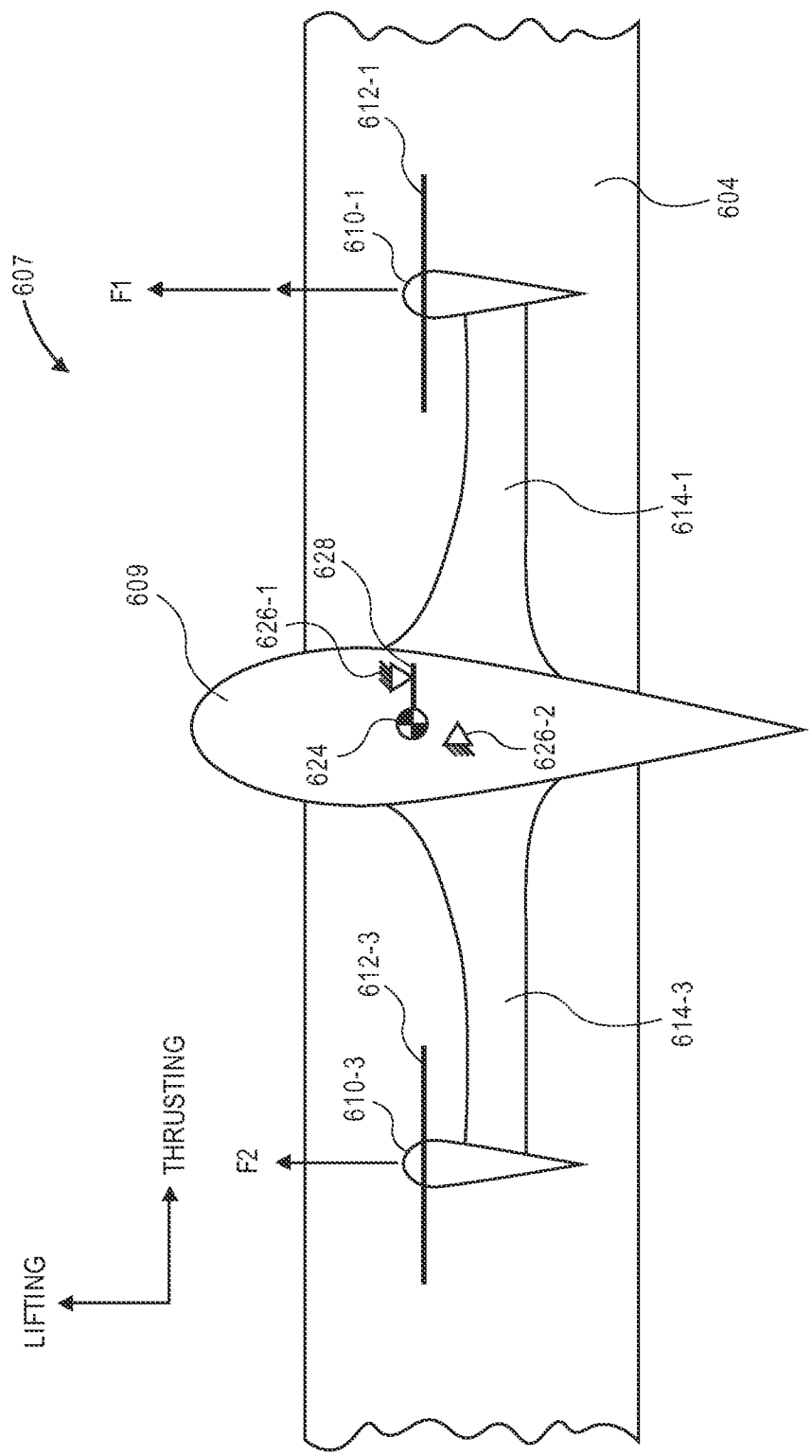
FIG. 6 depicts a block diagram of a side-view of a portion of a pivot assembly in a lifting position, according to an implementation.

FIG. 6 depicts a block diagram of a side-view of a portion of a pivot assembly 607 in a lifting position, according to an implementation. As illustrated above, the pivot assembly 607 extends from and rotates about a frame 604 of a UAV. The pivot assembly includes an axis 624 about which the pivot assembly 607 rotates. The pivot assembly may rotate on bearings, bushings, without the need of any additional motors, gears or other drive mechanisms other than the thrusting motors 610-1, 610-3 and corresponding thrusting propellers 612-1, 612-3 discussed above. In this example, the pivot arm 609 has an airfoil shape of a wing, similar to the pivot arms discussed above with respect to FIGS. 3-5. Likewise, the thrusting motors 610-1, 610-3 are coupled to motor arms 614-1, 614-3 that are coupled to the pivot arm 609 and the thrusting motors 610 are in opposite directions from the pivot arm 609.

Figure 7:
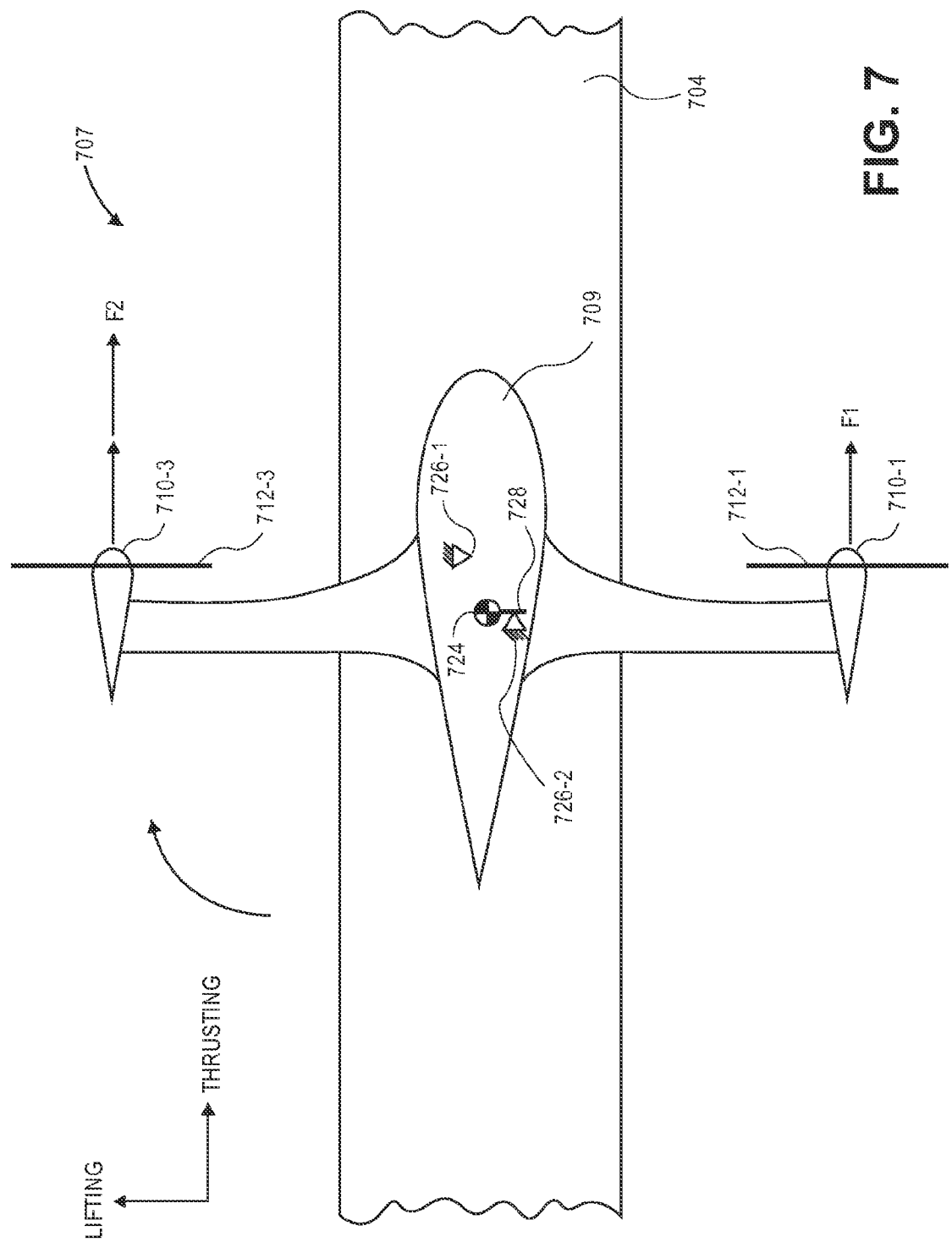
FIG. 7 depicts a block diagram of a side-view of a portion of a pivot assembly in a thrusting position, according to an implementation.

The pivot assembly may also include mechanical stops 626-1, 626-1 positioned at desired locations that will inhibit rotation of the pivot arm between the lifting position (FIG. 6) and the thrusting position (FIG. 7). For example, a stop bar 628 may extend from the axis of the pivot arm and be configured to engage the mechanical stops 626-1, 626-2 to inhibit the rotation of the pivot assembly. For example, as discussed above and as illustrated in FIGS. 3-4, if the force (F1) generated by the thrusting motor 610-1 and corresponding thrusting propeller 612-1 is greater than or approximately equal to the force (F2) generated by the thrusting motor 610-3 and corresponding thrusting propeller 612-3, the resulting differential force will keep the stop bar 628 engaged with the mechanical stop 626-1 and the pivot assembly will remain in the lifting position because the mechanical stop 626-1 is inhibiting rotation of the pivot arm in the first direction. In the lifting position, the thrusting motors 610 and thrusting propellers 612 may generate force to aid in the vertical lift of the UAV.

However, if the force (F2) generated by the thrusting motor 612-3 and corresponding thrusting propeller 612-3 exceeds the force (F1) of the thrusting motor 610-1 and corresponding thrusting propeller 612-1, the pivot assembly 607 will rotate about the axis 624 until the stop bar engages with the mechanical stop 626-2 and the pivot assembly is in the thrusting position, as illustrated in FIG. 7.

In some implementations, the pivot assembly 607 may include a dampener, electric brake, clutch or other inertial component that requires a differential force between the thrusting motor 610-1 and the thrusting motor 610-3 to exceed a threshold before the pivot assembly 607 will rotate from the lifting position (FIG. 6) to the thrusting position (FIG. 7), or from the thrusting position to the lifting position. Likewise, the dampener or other inertial component may be used to position the pivot assembly 607 at other angles with respect to the frame 604 of the UAV. For example, the dampener, electric brake, clutch, or other inertial component may be selectively engaged to stop and/or prohibit rotation of the pivot assembly 607 at any angle between the two mechanical stops.

FIG. 7 depicts a block diagram of a side-view of a portion of a pivot assembly 707 in a thrusting position, according to an implementation. Except where otherwise noted, reference numerals preceded by the number "8" shown in FIG. 7 indicate components or features that are similar to components or features having reference numerals preceded by the number "6" shown in FIG. 6.

As illustrated in FIG. 7, the pivot assembly 707 has rotated from the lifting position (FIG. 6) to the thrusting position (FIG. 7) because the force (F2) generated by the thrusting motor 710-3 and corresponding thrusting propeller 712-3 exceeds the force (F1) generated by the thrusting motor 710-1 and corresponding thrusting propeller 712-1. As shown, the stop bar 728 has rotated about the axis 724 from the mechanical stop 726-1 to the mechanical stop 726-2 and will remain engaged with the mechanical stop 726-2 as long as the force (F2) from the thrusting motor 710-3 and corresponding thrusting propeller 712-3 exceeds the force (F1) generated by the thrusting motor 710-1 and corresponding thrusting propeller 712-1 because the mechanical stop 726-2 is inhibiting rotation of the pivot arm in the second direction.

Figure 8:
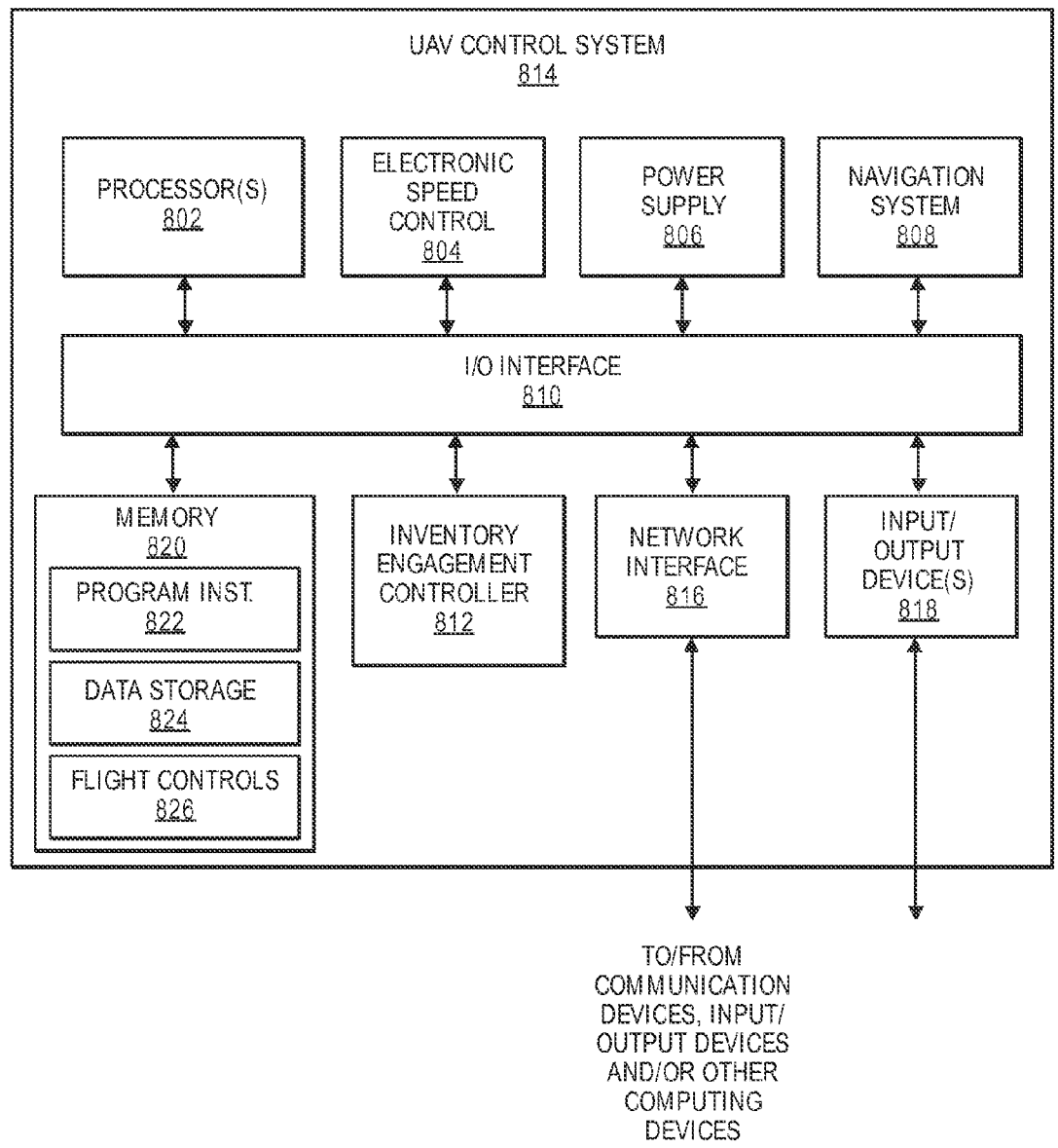
FIG. 8 is a block diagram of an illustrative implementation of an unmanned aerial vehicle control system, according to an implementation.

FIG. 8 is a block diagram illustrating an example UAV control system 814 of a UAV. In various examples, the block diagram may be illustrative of one or more aspects of the UAV control system 814 that may be used to implement the various systems and methods discussed herein and/or to control operation of a UAV. In the illustrated implementation, the UAV control system 814 includes one or more processors 802, coupled to a memory, e.g., a non-transitory computer readable storage medium 820, via an input/output (I/O) interface 810. The UAV control system 814 may also include electronic speed controls 804 (ESCs), power supply modules 806 and/or a navigation system 808. The UAV control system 814 further includes a payload engagement controller 812, a network interface 816, and one or more input/output devices 818.

In various implementations, the UAV control system 814 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, flight paths, flight control parameters, pivot assembly, and/or data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 820 as program instructions 822, data storage 824 and flight controls 826, respectively. In other implementations, program instructions, data, and/or flight controls may be received, sent, or stored upon different types of computer-accessible media, such as non-transitory media, or on similar media separate from the non-transitory computer readable storage medium 820 or the UAV control system 814. Generally speaking, a non-transitory, computer readable storage medium may include storage media or memory media such as magnetic or optical media, e.g., disk or CD/DVD-ROM, coupled to the UAV control system 814 via the I/O interface 810. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The ESCs 804 communicate with the navigation system 808 and adjust the rotational speed of each lifting motor and/or the thrusting motor to stabilize the UAV, guide the UAV along a determined flight path and/or cause rotation of the pivot assembly from a lifting position to a thrusting position or from a thrusting position to a lifting position.

The navigation system 808 may include a global positioning system (GPS), indoor positioning system (IPS), or other similar system and/or sensors that can be used to navigate the UAV to and/or from a location. The payload engagement controller 812 communicates with the actuator(s) or motor(s) (e.g., a servo motor) used to engage and/or disengage items.

The network interface 816 may be configured to allow data to be exchanged between the UAV control system 814, other devices attached to a network, such as other computer systems (e.g., remote computing resources), and/or with UAV control systems of other UAVs. For example, the network interface 816 may enable wireless communication between the UAV and a UAV control system that is implemented on one or more remote computing resources. For wireless communication, an antenna of an UAV or other communication components may be utilized. As another example, the network interface 816 may enable wireless communication between numerous UAVs. In various implementations, the network interface 816 may support communication via wireless general data networks, such as a Wi-Fi network. For example, the network interface 816 may support communication via telecommunications networks, such as cellular communication networks, satellite networks, and the like.

Input/output devices 818 may, in some implementations, include one or more displays, imaging devices, thermal sensors, infrared sensors, time of flight sensors, accelerometers, pressure sensors, weather sensors, etc. Multiple input/output devices 818 may be present and controlled by the UAV control system 814. One or more of these sensors may be utilized to assist in landing as well as to avoid obstacles during flight.

As shown in FIG. 8, the memory may include program instructions 822, which may be configured to implement the example routines and/or sub-routines described herein. The data storage 824 may include various data stores for maintaining data items that may be provided for determining flight paths, landing, identifying locations for disengaging items, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 814 is merely illustrative and is not intended to limit the scope of the present disclosure. In particular, the computing system and devices may include any combination of hardware or software that can perform the indicated functions. The UAV control system 814 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 814. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the UAV control system 814 may be transmitted to the UAV control system 814 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An unmanned aerial vehicle (UAV), comprising:
   a frame;

a plurality of lifting motors and corresponding lifting propellers oriented to provide a vertical lift to the UAV when the lifting propellers are rotated by the lifting motors, the plurality of lifting motors mounted to the UAV such that the plurality of lifting motors remain oriented to provide the vertical lift to the UAV when the lifting propellers are rotated by the lifting motors;

a pivot assembly coupled to the frame of the UAV and configured to rotate from a lifting position to a thrusting position, the pivot assembly including:
  a pivot arm that extends through the frame of the UAV and is configured to rotate with respect to the frame of the UAV;
  a first motor coupled to the pivot arm;
  a first propeller coupled to and rotatable by the first motor;
  a second motor coupled to the pivot arm and offset with respect to the first motor;
  a second propeller coupled to and rotatable by the second motor; and
wherein:
  the pivot assembly is in the lifting position when a first force generated by the first motor and corresponding first propeller is greater than a second force generated by the second motor and corresponding second propeller; and
  the pivot assembly is in the thrusting position when the second force generated by the second motor and corresponding second propeller is greater than the first force generated by the first motor and corresponding first propeller.

2. The UAV of claim 1, wherein the first force and the second force provide a lifting force for the UAV when the pivot assembly is in the lifting position.

3. The UAV of claim 1, wherein the first force and the second force provide a thrusting force when the pivot assembly is in the thrusting position.

4. The UAV of claim 1, wherein the first and the second pivot motors are approximately perpendicular to the frame of the UAV when the pivot assembly is in the thrusting position.

5. The UAV of claim 1, wherein at least a portion of the pivot arm is formed in a shape of a wing.

6. A vehicle, comprising:
a frame;
a lifting motor and corresponding lifting propeller oriented to provide a vertical lift to the vehicle when the lifting propeller is rotated by the lifting motor, the lifting motor mounted to the vehicle such that the lifting motor remains oriented to provide the vertical lift to the vehicle when the lifting propeller is rotated by the lifting motor;
a power module coupled to the frame;
a pivot assembly coupled to the frame, the pivot assembly comprising:
  a pivot arm configured to rotate about an axis with respect to the frame;
  a first motor coupled to the pivot arm and powered by the power module,
  wherein the first motor is configured to rotate with the pivot arm;
  a first propeller coupled to and rotatable by the first motor;
  a second motor coupled to the pivot arm and offset with respect to the first motor, the second motor powered by the power module, wherein the second motor is configured to rotate with the pivot arm;
  a second propeller coupled to and rotatable by the second motor; and
wherein:
  the pivot assembly is in a lifting position when a first force generated by the first motor and corresponding first propeller is greater than a second force generated by the second motor and corresponding second propeller; and
  the pivot assembly is in a thrusting position when the second force generated by the second motor and corresponding second propeller is greater than the first force generated by the first motor and corresponding first propeller.

7. The vehicle of claim 6, wherein the pivot assembly further includes an inertial component that prohibits rotation of the pivot assembly if the first force is less than a threshold.

8. The vehicle of claim 7, wherein the inertial component is at least one of a brake, a clutch, or a dampener.

9. The vehicle of claim 6, wherein at least a portion of the pivot arm is formed in a shape of a wing.

10. The vehicle of claim 6, wherein the vehicle is at least one of an aerial vehicle, an unmanned aerial vehicle, a ground based vehicle, an unmanned ground based vehicle, a water based vehicle, or an unmanned water based vehicle, a spacecraft, or an unmanned spacecraft.

11. The vehicle of claim 6, wherein the second motor is disengaged when the pivot assembly is in the lifting position.

12. The vehicle of claim 11, wherein the first motor provides vertical lift to the vehicle when the pivot assembly is in the lifting position.

13. The vehicle of claim 6, wherein the first motor is disengaged when the pivot assembly is in the thrusting position.

14. The vehicle of claim 13, wherein the second motor provides thrust to the vehicle when the pivot assembly is in the thrusting position.

15. The vehicle of claim 6, wherein the pivot assembly rotates between the lifting position and the thrusting position as a result of a differential force produced by the first motor and the second motor.

\* \* \* \* \*